United States Patent
Morooka

(10) Patent No.: US 6,504,092 B1
(45) Date of Patent: Jan. 7, 2003

(54) METHOD OF PREVENTING INSULATED WIRE BREAKAGE AND MOMENTARY INTERRUPTION

(75) Inventor: Yasunari Morooka, Fukuoka (JP)

(73) Assignee: Kyushu Electric Power Co., Inc., Fukuoka (JP)

(*) Notice: Subject to any disclaimer, the term of this patent is extended or adjusted under 35 U.S.C. 154(b) by 0 days.

(21) Appl. No.: 09/462,019

(22) PCT Filed: May 11, 1999

(86) PCT No.: PCT/JP99/02418

§ 371 (c)(1),
(2), (4) Date: Feb. 23, 2000

(87) PCT Pub. No.: WO99/59230

PCT Pub. Date: Nov. 18, 1999

(30) Foreign Application Priority Data

May 12, 1998 (JP) ............................................. 10-129328

(51) Int. Cl.[7] ................................................. H02G 7/00
(52) U.S. Cl. ............................... 174/40 R; 174/110 R; 361/117
(58) Field of Search .................. 174/40 R, 40 TD, 174/45 TD, 110 R, 2, 55 B, 194; 361/117

(56) References Cited

U.S. PATENT DOCUMENTS 3,739,075 A * 6/1973 Jean et al. ................. 174/40 R
4,472,756 A * 9/1984 Masuda ...................... 361/212
4,570,042 A * 2/1986 Yanabu et al. ........... 200/148 R
5,283,709 A * 2/1994 Shirakawa et al. ......... 361/117
6,108,187 A   8/2000 Podporkin et al. .......... 361/117

FOREIGN PATENT DOCUMENTS

| JP | 47045791 | 11/1972 | |
| JP | 56022518 | 3/1981 | |
| JP | 60160414 | 10/1985 | |
| JP | 61235444 A | * 10/1986 | ........... C08L/23/06 |
| JP | 04017220 A | * 1/1992 | ........... H01B/17/26 |
| JP | 04347534 | 12/1992 | |
| JP | 09331630 | 12/1997 | |

* cited by examiner

Primary Examiner—Dean A. Reichard
Assistant Examiner—W. David Walkenhorst
(74) Attorney, Agent, or Firm—Jordan and Hamburg LLP

(57) ABSTRACT

Method of generating creeping discharge with certainty without causing puncture is applied on the basis of researching the creeping discharge characteristic of insulated wire. An overhead distribution system including insulated wire is provided with an insulated wire for field relaxation having twice such a predetermined length that creeping flashover is occurred by lightening surge from supported point of the insulated wire by an insulator, but is not followed by AC follow current, and the insulated wire for field relaxation is disposed in parallel to the insulated wire, supported at its central portion by the insulator and connected at both ends of the conductor of the insulated wire for field relaxation to the conductor of the insulated wire and covered at their connected portion with an insulating cover.

2 Claims, 7 Drawing Sheets

METHOD OF PREVENTING INSULATED WIRE BREAKAGE AND MOMENTARY INTERRUPTION

This application is a 371 of PCT/JP99/02418 filed May 11, 1999.

BACKGROUND OF THE INVENTION

The present invention relates to a method of preventing breakage of insulated wire and momentary interruption caused by a lightening surge in the neighborhood of an insulator in a high voltage overhead distribution system.

The mechanism which causes breakage of insulated wire is well known. Specifically, that when an insulating cover in the neighborhood of an insulator is punctured by a lightening surge, multiphase flashover is followed by AC follow current through a metallic arm fixing insulator and the conductor of the insulated wire is vaporized by arcing heat as a result of AC short circuit current flowing concentrically to abovementioned punctured portion, thereby causing wire breakage. To prevent such insulated wire breakage, it is important that AC follow current occurring along a discharge circuit is cut off after the discharge circuit is formed by a lightening surge.

To solve these problems, applicants have already proposed, as disclosed, for example, in Japanese Patent Application No. Hei 8-171709, a method of preventing insulated wire breakage and momentary interruption by a lightening surge in an overhead distribution system including insulated wire, in which the conductor of said insulated wire is directly or indirectly exposed at a point spaced from a supported point of the insulated wire by an insulator in a predetermined length, whereby it is possible for creeping flashover to occur by a lightening surge but impossible for AC follow current to follow. This method has the effect that creeping discharge over the outer surface of insulated wire is not followed by an AC short circuit and wire breakage and momentary interruption are not caused when an insulation breakdown point of an insulated wire cover is separated from an insulator 75 cm apart in the case of a 6.6 kV overhead distribution system.

This method, nevertheless, requires research about the thickness of the insulating cover and the like, as the insulating cover is frequently punctured before creeping discharge occurs in the case of applied high voltage.

Thus, an object of the present invention is to provide a method in accordance with which creeping discharge is induced with certainty without puncture of insulated wire after determination of the creeping discharge characteristic of the insulated wire.

SUMMARY OF THE INVENTION

To solve the aforementioned problem, a method of preventing insulated wire breakage and momentary interruption according to this invention is characterized in that an overhead distribution system including insulated wire is provided with insulated wire for field relaxation having twice such a predetermined length, that creeping flashover occurs as a result of a lightening surge from a supported point of said insulated wire by an insulator but is not followed by AC follow current, and said insulated wire for field relaxation is disposed in parallel to said insulated wire, supported at its central portion by said insulator, connected at both ends of the conductor of said insulated wire for field relaxation to the conductor of said insulated wire and covered with an insulating cover at their connected portion.

Another method of preventing insulated wire breakage and momentary interruption according to this invention is also characterized in that overhead distribution system including insulated wire is provided with insulated wire for a grounded side back electrode having such a predetermined length that creeping flashover occurs as a result of a lightening surge from a supported point of said insulated wire by an insulator but is not followed by AC follow current, and said insulated wire for the grounded side back electrode is disposed in parallel to said insulated wire, one non-insulated end of the conductor of said insulated wire for grounded side back electrode being connected to a grounded terminal of said insulator and another insulated end of the conductor of said insulated wire for the grounded side back electrode from discharging electrode disposed on said insulated wire is insulated with insulating material.

DETAILED DESCRIPTION OF THE PREFERRED EMBODIMENTS

Practical embodiments of the present invention are described as follows.

Figure 1:
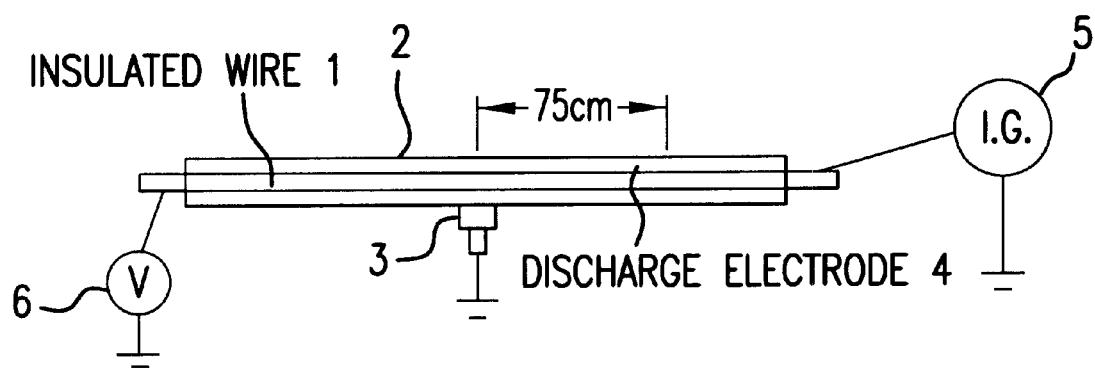
FIG. 1 is a schematic drawing showing a researching test for creeping discharge characteristic.

A test was conducted to ascertain the insulating efficiency of insulated wire and insulating tube, and the limiting voltage based on creeping discharge. The basic outline of the test is shown in FIG. 1. Insulated wire 1 with cover 2 was supported by pin type insulator 3 and fixed by copper bind in 1.2 mm diameter. Discharge electrode 4 was constructed by sticking a nail into insulated wire 1 at a point separated 75 cm apart from pin type insulator 3. Lightening impulse voltage (1.2/50 A s) was applied to one end of insulated wire 1 with varying crest value by impulse generator 5, and voltage (limiting voltage) generated against ground at that time and the time until occurrence of creeping discharge or puncture were relationally measured by voltmeter 6. A test was conducted to research efficiency of sole insulated wire (without insulator) by making insulator 3 short circuit in use of copper bind. A test was also conducted to research efficiency of insulating cover itself without sticking nail and causing creeping discharge.

Figure 2:
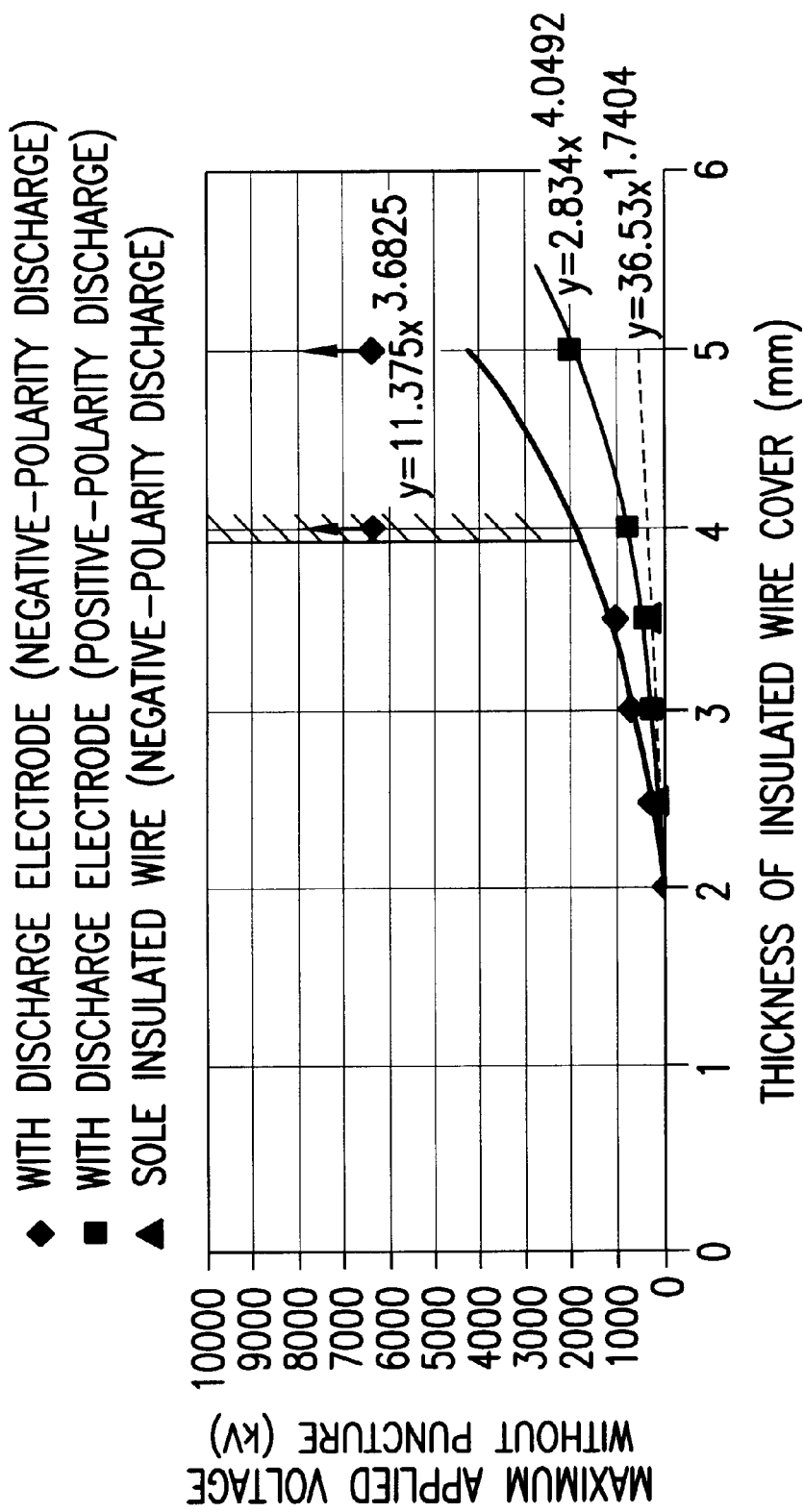
FIG. 2 is a graph showing characteristic relationship between a thickness of an insulating layer and a maximum applied voltage without causing puncture.
Figure 3:
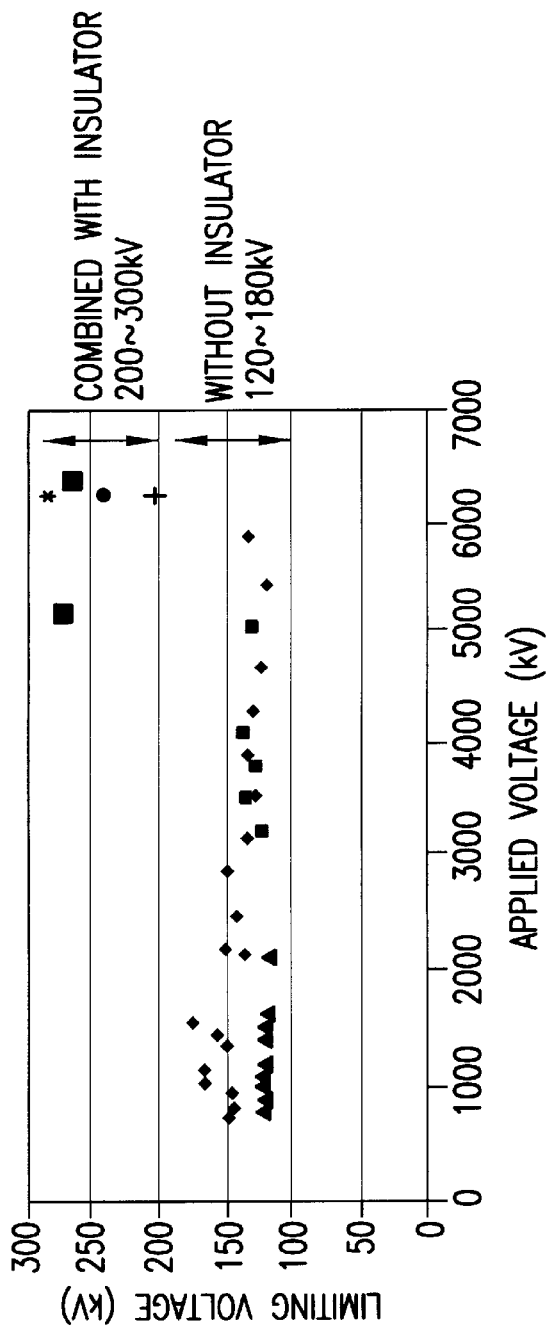
FIG. 3 is a graph showing the characteristic relationship between applied voltage and limiting voltage.

The results of the testing were as follows. Relationship between thickness of the insulating cover and maximum applied voltage at which puncture is not caused on each insulating cover (hereinafter called solely maximum applied voltage) respectively in the case of sole insulated wire and in the case of providing a creeping discharge electrode, is shown in FIG. 2. It is understood from this that the provision of a creeping discharge electrode allows higher voltage to be applied and restrains voltage applied to insulating cover by creeping discharge in comparison with the sole insulated wire. It is further understood that this effect is more remarkable for an insulating cover according to an increase of its thickness and for negative-polarity voltage (voltage such as in which the wire conductor is negative and the grounded side positive) in comparison with a positive one. In the case of negative polarity voltage applied, the maximum applied voltage rapidly increases in 4 mm or more thickness of insulating cover and voltage in 6,200 kV can be applied without puncture. In FIG. 3 showing limiting voltage of the insulating cover by creeping discharge, it is considered that it is quite possible that insulating wire with a predetermined level of insulating efficiency could withstand puncture even though increasing voltage applied, as limiting voltage without combination of insulator is dispersed in the scope from 120–180 kV without relation to applied voltage. It is considered that limiting voltage in the case of combination with insulator is dispersed from 200–300 kV because the time until creeping discharge becomes long in combination with insulator and voltage applied to the insulating cover becomes larger during that time.

Figure 4:
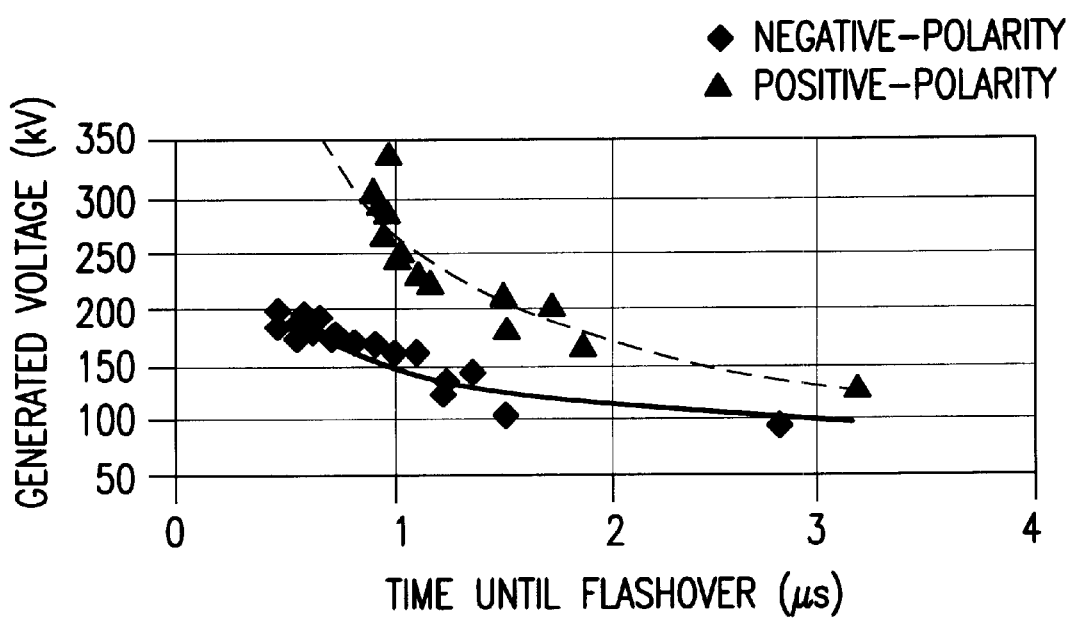
FIG. 4 is a graph showing creeping discharge voltage-time characteristic.

Creeping discharge voltage-time characteristic (FIG. 4) and relationship between applied voltage and time until flashover were precisely researched to clarify influence of polarity of applied voltage in creeping discharge. Considerably high voltage is generated in the case of positive-polarity as compared with negative-polarity (FIG. 4).

Figure 5:
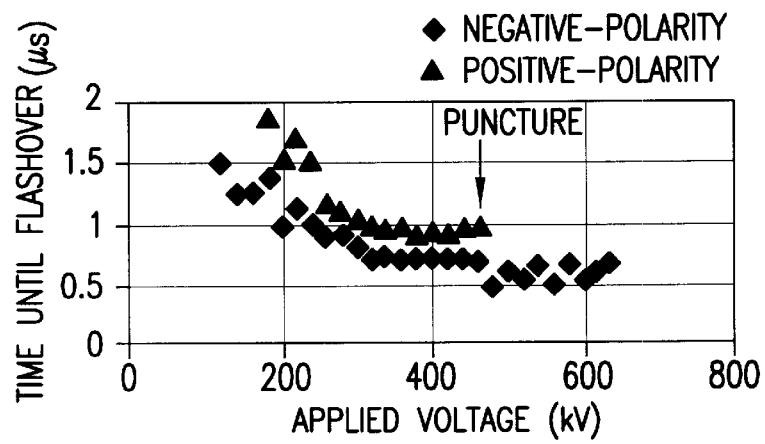
FIG. 5 is a graph showing the relationship between applied voltage and time until flashover.

It is presumed that positive-polarity creeping discharge does not occur smoothly in comparison with negative-polarity by reason that the positive-polarity case needs a longer time until flashover in comparison with the negative-polarity case (FIG. 5). It is considered that positive-polarity creeping discharge takes more time until flashover and generated voltage becomes high (FIG. 4), and as a result maximum applied voltage becomes low (FIG. 2).

Applicants invented two methods (FIGS. 6, 7) solving the influence of polarity and proving its effectiveness by test in order to be put into practical use. It is considered that a free electron in space is bounded and impossible to contribute to the progress of creeping discharge under the influence of the field over the outer surface of the electric wire in positive-polarity creeping discharge, and finally proposes relaxing of the field over the outer surface of wire.

Figure 6:
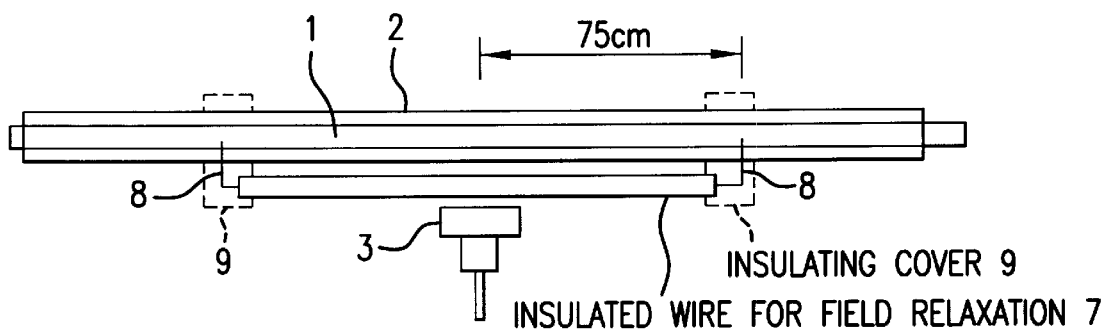
FIG. 6 is a sectional view of a first embodiment according to the present invention.

FIG. 6 is a sectional view showing construction of first embodiment and an insulated wire for field relaxation 7 is disposed to cling to insulated wire 1 between insulated wire 1 and ground. Each conductor end 8 of insulated wire for field relaxation 7 is connected to insulated wire 1 and insulated with insulated cover 9 at a point spaced 75 cm apart from insulator 3.

Figure 7:
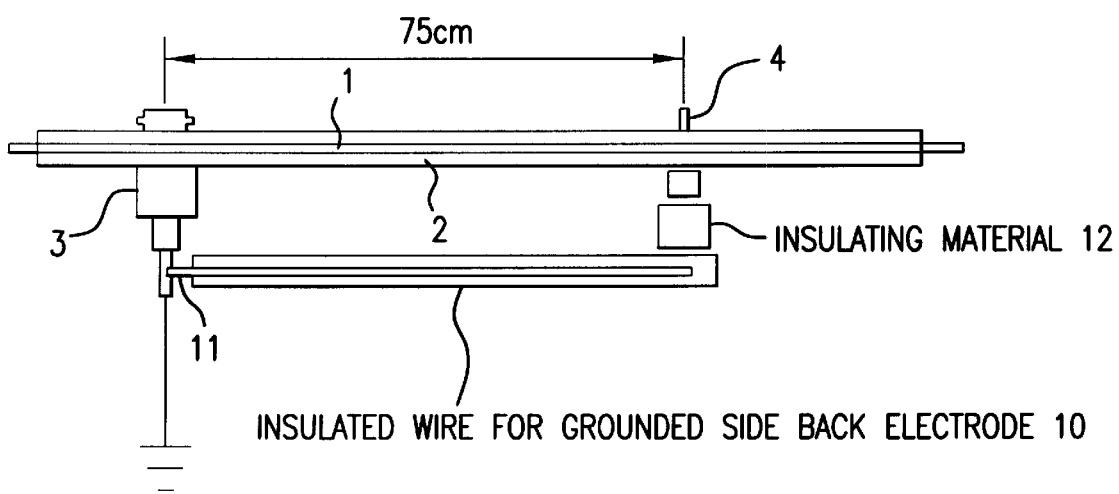
FIG. 7 is a sectional view of a second embodiment according to the present invention.

FIG. 7 is a sectional view showing construction of second embodiment and in which a grounded side back electrode 10 is disposed on the ground side of insulated wire 1 with one non-insulated end 11 of conductor connected to a grounded terminal of insulator 3 and another insulated end insulated from insulated wire 1 by insulating material 12. Distance between insulator 3 and insulating material 12 is 75 cm.

Figure 8:
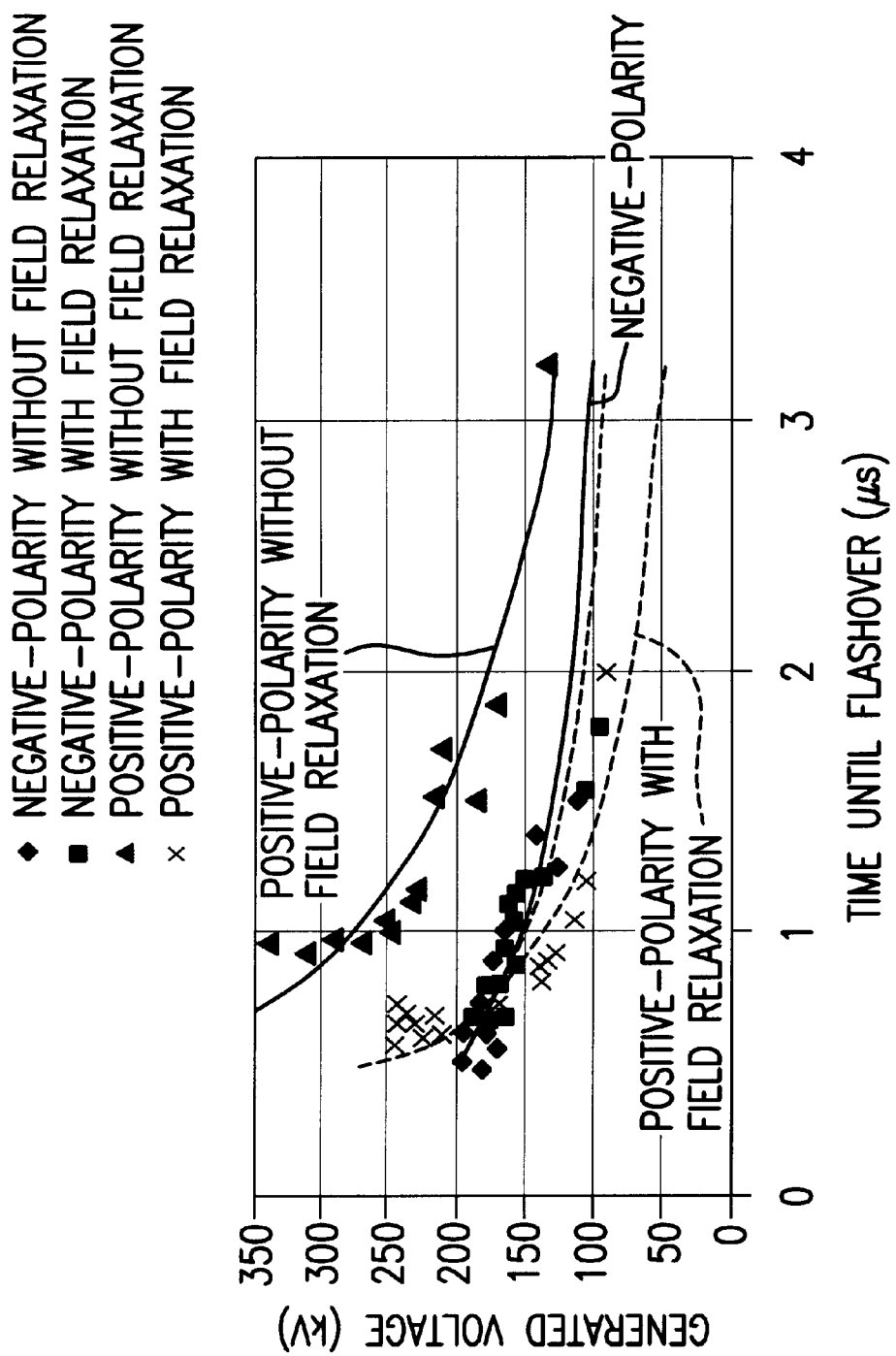
FIG. 8 is a graph showing creeping discharge voltage-time characteristic.

As shown in FIG. 8, even in a positive creeping discharge, the embodiment employing the insulated wire for field relaxation provides an improved voltage-time characteristic, in that positive-polarity creeping discharge is generated in accordance with the same voltage-time characteristic as a negative-polarity one, and creeping discharge is generated smoothly. In accordance with the method using the grounded side back electrode 10, flashover runs along the surface of insulated wire (main line) 1 at negative-polarity voltage applied and flashover runs along the surface of insulated wire for grounded side back electrode 10. Thus, insulated wire in 4 mm diameter which is caused puncture at 854 kV of positive-polarity voltage applied, is improved to withstand puncture even at 6,200 kV applied as same as negative-polarity voltage applied.

Lightening impulse test in use of mimic distribution line in practical scale

Summary of Test

Generation of creeping discharge along necessary distance (75 cm) is confirmed in use of mimic distribution line by taking various measures and applying large lightening impulse current (maximum current 17 kA, 1.5/11 a s) generated by large-sized impulse generator (maximum generating voltage 12 MV).

Result of Test is Shown in Table 1

The following is understood relating to such lightening impulse current as approximately 17 kA of lightening impulse peak current (approximately 30% in occurrence rate) from this test result.

(1) It is possible to generate creeping discharge without causing puncture in 4 mm or more insulation thickness of power cable in the case of using overhead ground wire and in 6 mm or more insulation thickness of power cable in the case of not using overhead ground wire.

(2) By method eliminating polarity of lightening, it is possible to decrease necessary insulation thickness of power cable to 3 mm or more in the case of using overhead ground wire and 4 mm or more in the case of not using overhead ground wire.

According to the present invention, it is possible, as mentioned above, that insulated wire with insulating efficiency in a predetermined level does not experience puncture because the voltage restraining effect of creeping discharge is beyond expectation as result of researching creeping discharge characteristic of insulated wire. It is also possible to eliminate influence of polarity of applied voltage although creeping discharge characteristic often receives influence of its polarity and does not show effect of restraining voltage.

TABLE 1

| Tested Unit | | With overhead ground wire Lightening impulse point: Top of pole | | | | | | Without overhead ground wire Lightening impulse point: Top of pole | | | | | | Without overhead ground wire Lightening impulse point: Power line | | | | | |
|---|---|---|---|---|---|---|---|---|---|---|---|---|---|---|---|---|---|---|---|
| | | Positive Polarity | | | Negative Polarity | | | Positive Polarity | | | Negative Polarity | | | Positive Polarity | | | Negative Polarity | | |
| Insulator Withstand Voltage | Wire | Pole Body | 100 Ω | 50 Ω | Pole Body | 100 Ω | 50 Ω | Pole Body | 100 Ω | 50 Ω | Pole Body | 100 Ω | 50 Ω | Pole Body | 100 Ω | 50 Ω | Pole Body | 100 Ω | 50 Ω |
| 90 kV | Cable 6 mm | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| 60 kV | Cable 4 mm | ◯ | ◯ | ◯ | ◯ | ◯ | ◯ | ◯ | ◯ | ◯ | X | X | ◯ | X ☆ | X | ◯ | ◯ | ◯ | ◯ |
| 20 kV | OE-5 mm | ◯ | ◯ | ◯ | X | X | X | ◯ | ◯ | ◯ | X | X | X | X | X | X | X | X | X |
| | OE-4 mm | ◯ | ◯ | ◯ | X | X | X | ◯ | ◯ | ◯ | X | X | X | X | X | X | X | X | X |
| | OC-3.5 mm | ◯ | ◯ | ◯ | X | X | X | ◯ | ◯ | ◯ | X | X | X | X | X | X | X | X | X |
| | OC-3.0 mm | ◯ | ◯ | ◯ | X * | X | X | X | X | X | X | X | X | X | X | X | X | X | X |
| | OE-2.5 mm | X | X | X | X | X | X | X | X | X | X | X | X | X | X | X | X | X | X |
| | OE-2 mm | X | X | X | X | X | X | X | X | X | X | X | X | X | X | X | X | X | X |

◯: non-puncture (creeping discharge)
X: puncture
*: non-puncture by using grounded side back electrode
☆: non-puncture by using insulated wire for field relaxation

What is claimed is:

1. A method of preventing insulated wire breakage and momentary interruption in an overhead distribution system which includes a first insulated wire, the method comprising the steps of:

disposing a second insulated wire for providing field relaxation in parallel with said first insulated wire while supporting a central portion of said second insulated wire with a supporting insulator, said second insulated wire having a length twice a given distance from a support point at which said first insulated wire is supported by said supporting insulator along said first insulated wire, said given distance being arranged to allow creeping flashover to be caused without subsequent AC dynamic current between said first insulated wire and said supporting insulator when a conductor of said first insulated wire is exposed one of directly and indirectly to the outside at a position thereof away from said support point by said distance; and electrically connecting opposed ends of a conductor of said second insulated wire to said electrical conductor of said first insulating wire.

2. A method of preventing insulated wire breakage and momentary interruption in an overhead distribution system which includes a first insulated wire, the method comprising the steps of:

disposing a second insulated wire in parallel with said first insulated wire, said second insulated wire including a conductor which has an insulated end and another non-insulated end, said second insulated wire having a length equal to a given distance along said first insulated wire from a support point at which said first insulated wire is supported by a supporting insulator, said given distance being arranged to allow creeping flashover to be caused without subsequent AC dynamic current between said first insulated wire and said supporting insulator when a conductor of said first insulated wire is exposed one of directly and indirectly to the outside at a position thereof away from said support point by said distance; and electrically connecting said non-insulated end of said conductor of said second insulated wire to a grounding terminal of said supporting insulator.

* * * * *